(12) United States Patent
Riesenman et al.

(10) Patent No.: US 6,822,976 B1
(45) Date of Patent: Nov. 23, 2004

(54) METHOD AND APPARATUS FOR HIGH THROUGHPUT MULTIPLEXING OF DATA

(75) Inventors: Robert Riesenman, Sacramento, CA (US); Hou-Sheng Lin, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/433,628

(22) Filed: Nov. 3, 1999

(51) Int. Cl.$^7$ .................................................. H04J 3/02
(52) U.S. Cl. ........................ 370/539; 326/38; 327/407
(58) Field of Search ............................. 370/537, 538, 370/539; 326/38, 104, 105; 327/407, 408; 711/5

(56) References Cited

U.S. PATENT DOCUMENTS

| | | | | |
|---|---|---|---|---|
| 4,825,105 A | * | 4/1989 | Holxle | 326/104 |
| 5,198,705 A | * | 3/1993 | Galbraith et al. | 326/37 |
| 5,491,431 A | * | 2/1996 | Nasserbakht | 326/38 |
| 5,510,742 A | * | 4/1996 | Lemaire | 327/146 |
| 5,815,023 A | * | 9/1998 | Webber et al. | 327/407 |
| 6,104,731 A | * | 8/2000 | Chow | 370/537 |

* cited by examiner

Primary Examiner—Steven Nguyen
Assistant Examiner—Roberta Stevens
(74) Attorney, Agent, or Firm—Blakely, Sokoloff, Taylor & Zafman LLP

(57) ABSTRACT

A method and apparatus for high throughput multiplexing of data is described. It includes a circuit including: A first multiplexer having an output, a first input, a second input, and a selector. A second multiplexer having an output, a first input, a second input, and a selector, the output of the second multiplexer coupled to the first input of the first multiplexer. A third multiplexer having an output, a first input, a second input, and a selector, the output of the third multiplexer coupled to the second input of the first multiplexer; and the selector of the first multiplexer to select an input with a stable signal.

22 Claims, 11 Drawing Sheets

METHOD AND APPARATUS FOR HIGH THROUGHPUT MULTIPLEXING OF DATA

BACKGROUND OF THE INVENTION

1. Field of the Invention

The present invention is generally related to the field of electronic circuits and more specifically related to the field of multiplexing circuitry and data processing circuitry.

2. Description of the Related Art

Cascading of multiplexing circuits is well known as a method of creating multiplexing circuits with larger numbers of inputs. A conventional schematic for cascading three multiplexing circuits (MUXes) is illustrated in FIG. 1B. MUX C is controlled by select signal S0, receives as its inputs the outputs of MUX A (G) and MUX B (H), and the output of MUX C (F) is routed to a flip-flop F4. Select signal S0 determines whether the output of MUX A or the output of MUX B is routed through MUX C. Likewise, MUX A receives signals D0 and D1 as its inputs, and whether D0 or D1 is routed through MUX A to become output G is determined by signal S1. MUX B receives signals D2 and D3 as its inputs, and signal S1 likewise controls whether D2 or D3 is routed through MUX B to become output H. The following truth table further explains the behavior of the circuit of FIG. 1B.

| D0 | D1 | D2 | D3 | S0 | S1 | G | H | F |
|----|----|----|----|----|----|---|---|---|
| d0 | d1 | d2 | d3 | 0 | 0 | d0 | d2 | d0 |
| d0 | d1 | d2 | d3 | 0 | 1 | d1 | d2 | d1 |
| d0 | d1 | d2 | d3 | 1 | 0 | d0 | d3 | d2 |
| d0 | d1 | d2 | d3 | 1 | 1 | d1 | d3 | d3 |

Such a circuit has a delay time $$t_d = \text{MAX}(T_{delay}\text{MUX}A, T_{delay}\text{MUX}B) + T_{delay}\text{MUX}C$$

Since the operating frequency of the circuit corresponds to the delay, the operating frequency of the multiplexing circuit is limited by the speed of signals through two stages of the MUX stage for 4:1 selection.

Prior art systems which incorporate multiplexing circuitry often use a configuration of components as illustrated in FIG. 1A. CPU 101 (a Central Processor or Processor) is coupled to a component referred to as a Host Bridge 105, and thereby coupled to the rest of the system. Host Bridge 105 is coupled to Memory 103, the main memory of the system, and Host Bridge 105 is also coupled to I/O Bridge 107 (Input/Output Bridge). I/O Bridge 107 couples to Keyboard 109, Mouse 111, and Disk Drive 110, and may couple to other components in a bus or point-to-point fashion. Through these couplings, CPU 101 is coupled to each component in the system, and may read or write information to each of the devices (within the capabilities of those devices).

Further extending the complexity of the system, PCI Bus 125 (Peripheral Component Interconnect Bus based on the Peripheral Component Interconnect Bus Specification Revision 2.1 or 2.2 from the Portland PCI Working Group as published by Intel Corporation) may be involved in the coupling of Host Bridge 105 to I/O Bridge 107, and may thereby couple to PCI Agents 120. Thus, through Host Bridge 105, CPU 101 may communicate with PCI Agents 120. While it is advantageous to make PCI Agents 120 available to the system, incorporating the PCI Bus 125 into a coupling or connection between the Host Bridge 105 and the I/O Bridge 107 further complicates the physical devices and layout, and the protocols for communication over that coupling.

SUMMARY OF THE INVENTION

A method and apparatus for high throughput multiplexing of data is described. It includes a circuit including: A first multiplexer having an output, a first input, a second input, and a selector. A second multiplexer having an output, a first input, a second input, and a selector, the output of the second multiplexer coupled to the first input of the first multiplexer. A third multiplexer having an output, a first input, a second input, and a selector, the output of the third multiplexer coupled to the second input of the first multiplexer; and the selector of the first multiplexer to select an input with a stable signal.

BRIEF DESCRIPTION OF THE DRAWINGS

The present invention is illustrated by way of example and not limitation in the accompanying figures.

DETAILED DESCRIPTION

A method and apparatus for high throughput multiplexing of data is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
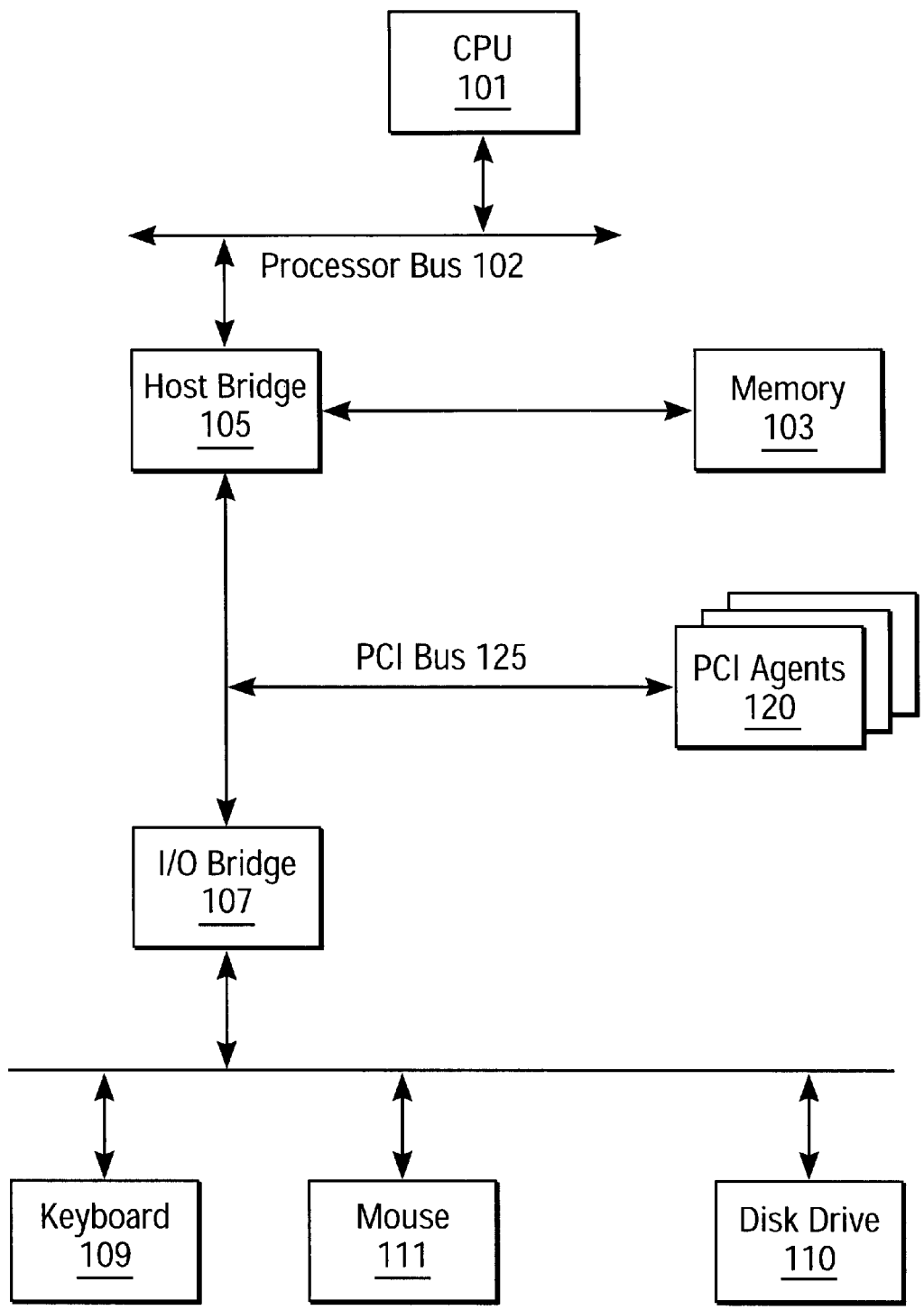
FIG. 1A illustrates a prior art system which may incorporate a multiplexing circuit.
Figure 1B:
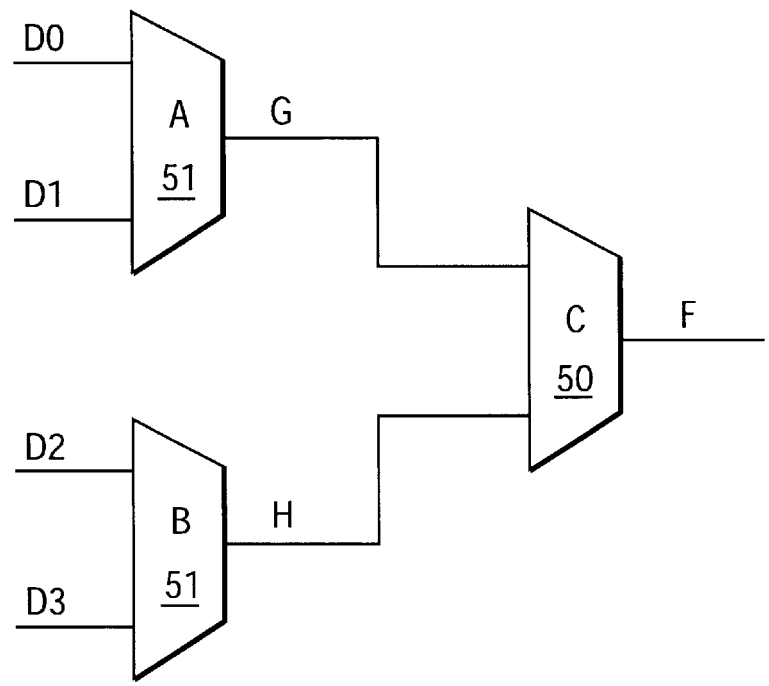
FIG. 1B illustrates a prior art multiplexing circuit.
Figure 2:
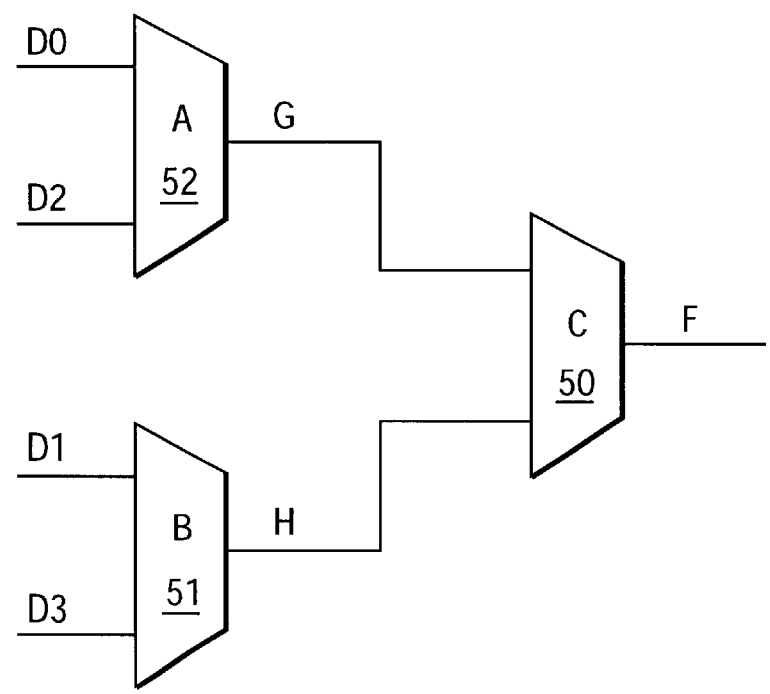
FIG. 2 illustrates a multiplexing circuit.

Turning to FIG. 2, an alternative circuit for a 4:1 MUX is illustrated. In this circuit, MUX A selects between input D0 and input D2 based on the value of select signal S2 to produce output G. MUX B selects between D1 and D3 based on the value of select signal S1 to generate output H. Output G and output H are routed to MUX C, which selects between the two based on select signal S0 to generate output F.

output H. Finally, output G and output H are selected by selection signal S0 to generate output F. The following truth table illustrates the results of proper coordination of such signals.

| D0 | D1 | D2 | D3 | D4 | D5 | D6 | D7 | S0 | S1 | S2 | S3 | S5 | S4 | S6 | A | B | C | D | G | H | F |
|----|----|----|----|----|----|----|----|----|----|----|----|----|----|----|----|----|----|----|----|----|----|
| d0 | d1 | d2 | d3 | d4 | d5 | d6 | d7 | 0 | 0 | 0 | 0 | 0 | 0 | 0 | d0 | d2 | d1 | d3 | d0 | d1 | d0 |
| d0 | d1 | d2 | d3 | d4 | d5 | d6 | d7 | 1 | 1 | 0 | 1 | 0 | 0 | 0 | d4 | d2 | d1 | d3 | d2 | d1 | d1 |
| d0 | d1 | d2 | d3 | d4 | d5 | d6 | d7 | 0 | 1 | 1 | 1 | 1 | 0 | 0 | d4 | d2 | d5 | d3 | d2 | d3 | d2 |
| d0 | d1 | d2 | d3 | d4 | d5 | d6 | d7 | 1 | 0 | 1 | 1 | 1 | 1 | 0 | d4 | d6 | d5 | d3 | d4 | d3 | d3 |
| d0 | d1 | d2 | d3 | d4 | d5 | d6 | d7 | 0 | 0 | 0 | 1 | 1 | 1 | 1 | d4 | d6 | d5 | d7 | d4 | d5 | d4 |
| d0 | d1 | d2 | d3 | d4 | d5 | d6 | d7 | 1 | 1 | 0 | 0 | 1 | 1 | 1 | d0 | d6 | d5 | d7 | d6 | d5 | d5 |
| d0 | d1 | d2 | d3 | d4 | d5 | d6 | d7 | 0 | 1 | 1 | 0 | 0 | 1 | 1 | d0 | d6 | d1 | d7 | d6 | d7 | d6 |
| d0 | d1 | d2 | d3 | d4 | d5 | d6 | d7 | 1 | 0 | 1 | 0 | 0 | 0 | 1 | d0 | d2 | d1 | d7 | d0 | d7 | d7 |

Utilizing this circuit in accordance with the following truth table, with the signals changing in the sequence shown by the truth table, the delay introduced by this circuit may be reduced due to masking of the first stage of the MUX circuits.

| D0 | D1 | D2 | D3 | S0 | S1 | S2 | G | H | F |
|----|----|----|----|----|----|----|----|----|----|
| d0 | d1 | d2 | d3 | 0 | 0 | 0 | d0 | d1 | d0 |
| d0 | d1 | d2 | d3 | 1 | 0 | 1 | d2 | d1 | d1 |
| d0 | d1 | d2 | d3 | 0 | 1 | 1 | d2 | d3 | d2 |
| d0 | d1 | d2 | d3 | 1 | 1 | 0 | d0 | d3 | d3 |

As will be apparent on examination of the truth table, each row after the first has the input to MUX C present when MUX C switches to route that input through to output F. Moreover, in going from the fourth row to the first row, the same effect is achieved, thus allowing for continuous switching of the various data values without incurring the delay inherent in the earlier MUX stage. In effect, the preceding MUX, either A or B, only switches its output when MUX C switches away from that output. It will be appreciated that the above truth table is not the only way to achieve this. By following the rule that no MUX switches its output when that output is routed through the next stage MUX, this result can be achieved. The timing in this example is $$t_{delay} = t_{delay}\text{MUX}C$$

Figure 3:
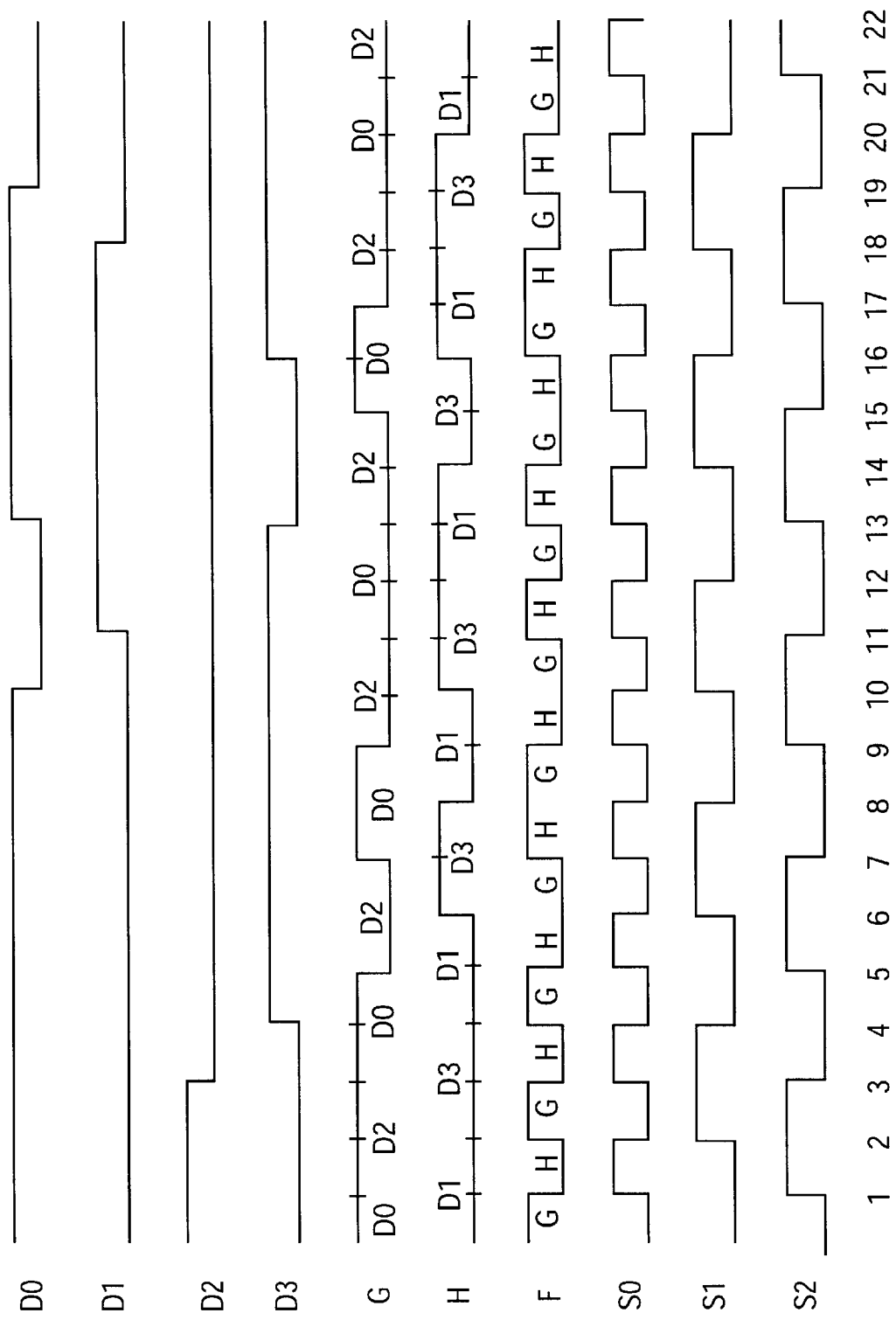
FIG. 3 illustrates a timing diagram representing the signals of the multiplexing circuit of FIG. 2.

When following the rule that switching only occurs when the output of the MUX (or signal) is not used by the next stage, timing such as that displayed in FIG. 3 may be achieved. It will be appreciated that the output of MUX C (output F) depends on a stable input, S1 and S2 only switch when the output of their associated MUXes is not being used by MUX C to produce an output. Furthermore, the data lines D0, D1, D2, and D3 only switch when their corresponding MUX is not routing their signal through to its output.

Figure 4:
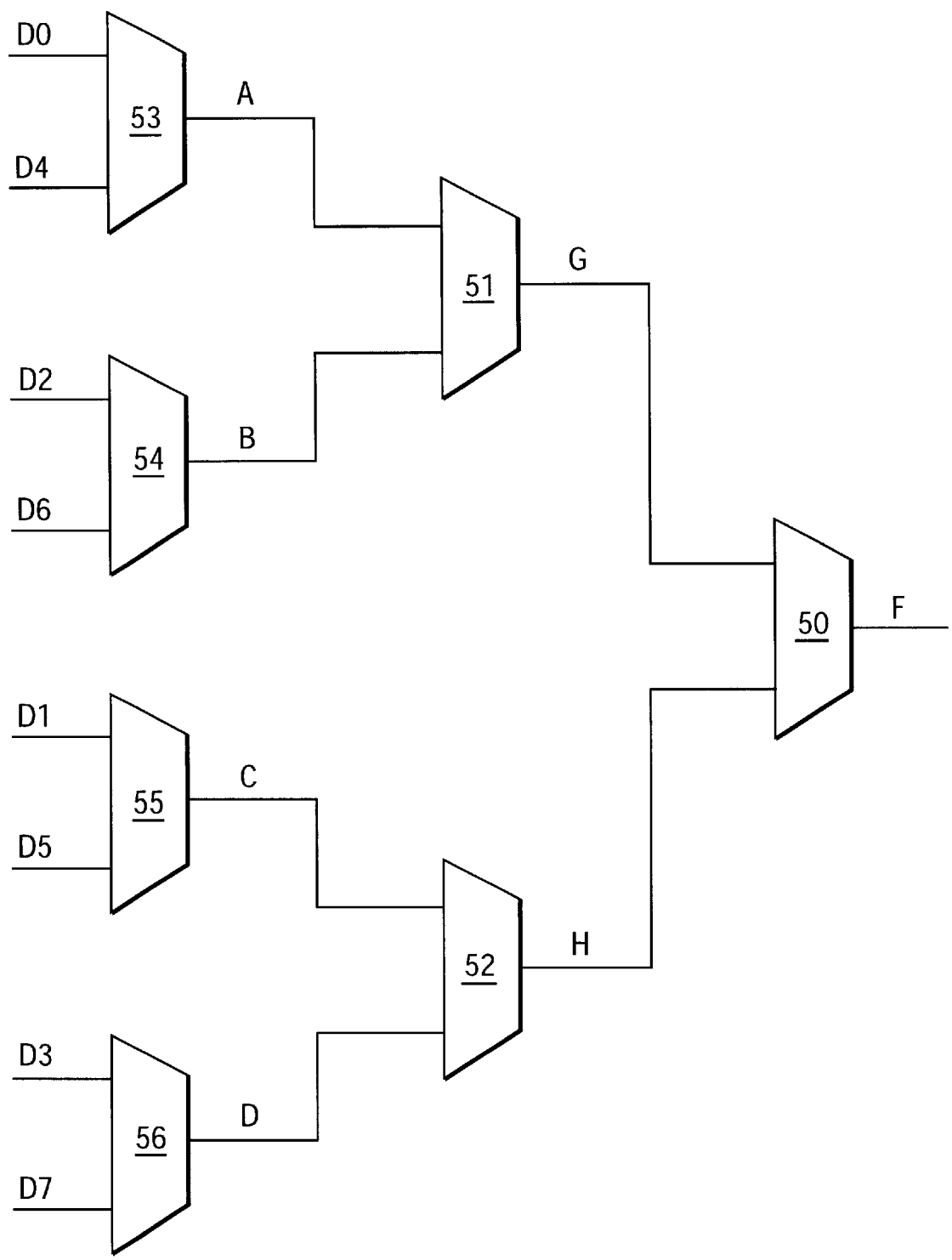
FIG. 4 illustrates an alternative multiplexing circuit.

Turning to FIG. 4, an 8:1 MUX circuit is illustrated, based on the same principles described for the 4:1 MUX of FIG. 2. Output A is generated from signal D0 and signal D4 based on selection signal S3. Output B is generated from signal D2 and signal D6 based on selection signal S4. Output A and Output B feed into a second stage MUX where selection signal S1 determines which will generate output signal G. Signals D1 and D5 are selected by selection signal S5 to generate output C. Likewise, signals D3 and D7 are selected by selection signal S6 to generate output D. Output C and output D are then selected by selection signal S2 to generate As will be apparent, the delay for this 8:1 MUX may also be reduced to $$t_{delay} = t_{delay}\text{MUX}S0$$

This is a vast improvement over a MUX operating without any constraints, which would then have a delay $$t_{delay} = \text{MAX}(\text{MAX}(t_{delay}\text{MUX}S3, t_{delay}\text{MUX}S4) + t_{delay}\text{MUX}S1, \\ \text{MAX}(t_{delay}\text{MUX}S5, t_{delay}\text{MUX}S6) + t_{delay}\text{MUX}S2) + t_{delay}\text{MUX}S0$$

It will be further appreciated that a variety of waveforms may be used to operate the 8:1 MUX while still masking the presence of the earlier stages of the MUX. Furthermore, it will be appreciated that these MUXes may be expanded to larger sizes while still maintaining the masking effect. Additionally, it will be appreciated that not all of the inputs need be used, such that a 3:1 or 6:1 MUX may be created using similar structures, while still within the spirit and scope of the invention. In particular, a 4:1 MUX may be modified to form a 3:1 MUX by tying two of the inputs of the 4:1 MUX together, and only switching those inputs when the output MUX (MUX C in FIG. 2 for instance) is routing the other inputs through to the output. Furthermore, it will be appreciated that a 3:1 MUX may be implemented by using a 4:1 MUX and discarding the results of every fourth cycle.

Additionally, it will be appreciated that not all levels of the MUX need be masked, thereby allowing greater flexibility in implementation. For instance, the S1 and S2 MUXes of the 8:1 MUX may be allowed to switch while their outputs are routed through the S0 MUX. If the preceding stage of MUXes (S3, S4, S5, and S6) still do not switch when their outputs are routed through either the S0 or S1 MUX, then the 8:1 MUX will appear to have the delay of a conventional 4:1 MUX for purposes of how quickly data may be switched at its output.

Figure 5:
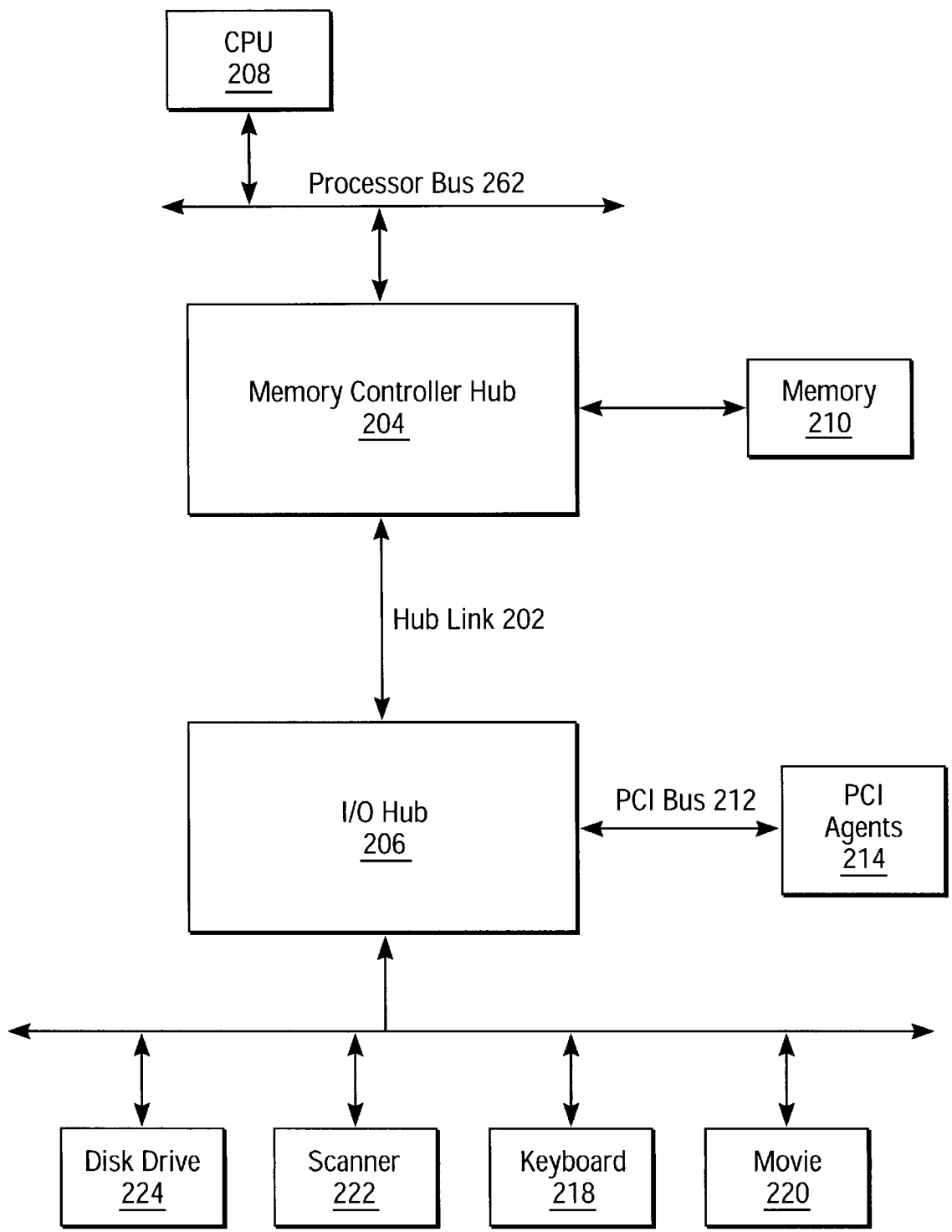
FIG. 5 is a block diagram of one embodiment of a computer system implementing the improved interface between computer components.

One application for a multiplexing circuit and method as described above is for use in a hub interface design. A hub interface is further described below. As illustrated in FIG. 5, one embodiment of the hub interface provides individual components with a point-to-point interface. In alternative embodiments, however, the hub interface may provide an interface between three or more components.

More specifically, FIG. 5 illustrates one embodiment of the hub interface 204 used to interconnect two separate components (i.e., hub agents) within a chipset. The hub agents provide a central connection between two or more separate buses and/or other types of communication lines.

For example, as further shown in FIG. 5, the chipset includes a memory controller hub (MCH) 204 and an input/output (IO) hub 206. The memory controller hub 204, as shown in FIG. 5, provides an interconnection/hub between one or more Central Processing Units 208 (CPU)

and the system memory 210. The CPU 208 is coupled to a Processor Bus 262 which is couple to the MCH 204.

In one embodiment, CPU 208 and MCH 204 are integrated into a single component or integrated circuit. In an alternative embodiment, MCH 204 and a graphics controller or accelerator (not shown) are integrated into a single component or integrated circuit. In another alternative embodiment, CPU 208 and a graphics controller or accelerator are integrated into a single component or integrated circuit. In still another alternative embodiment, CPU 208, MCH 204 and a graphics controller or accelerator are integrated into a single component or integrated circuit. As such, it will be appreciated that integration or separation of the components in the various figures is within the spirit and scope of the present invention.

The I/O hub 206 provides an interconnection between various peripheral components within the system (e.g. a keyboard 218, disk drive 224, scanner 222 and/or mouse 220.) Moreover, the external busses and their agents (e.g., PCI bus 212 and PCI agents 214), interconnect indirectly with the memory 210 and CPU 208 via the hub interface 202, by interconnecting with the I/O hub 206, rather than interconnecting directly with the memory controller hub 204.

By using the hub interface to interconnect the memory controller hub 204 and the I/O hub 206, improved access is provided between I/O components and the CPU/memory subsystem (e.g., increased bandwidth, protocol independence, and lower latency.) In addition, the hub interface may also improve the scalability of a computer system (e.g., upgrading from a base desktop platform to high-end desktop platforms or workstation platform) by providing a backbone for I/O building blocks.

To provide the improved interface, the hub interface includes one or more unique features. In one embodiment, transactions are transferred across the hub interface using a packet based split-transaction protocol. For example, a Request Packet is used to start a transaction and a separate Completion Packet may subsequently be used to terminate a transaction, if necessary.

Figure 6:
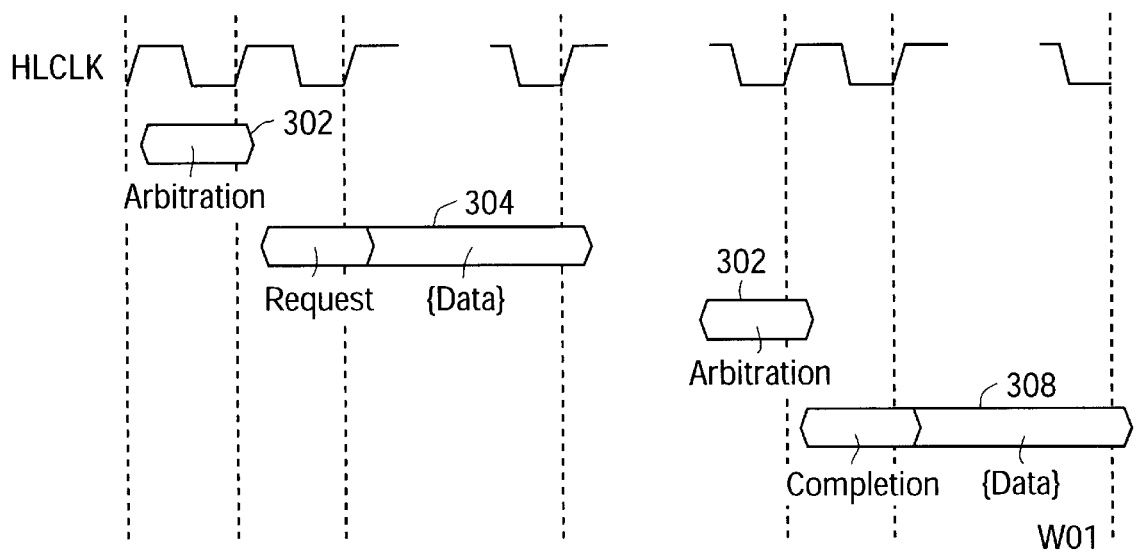
FIG. 6 is a timing diagram illustrating a split transaction implemented by one embodiment of an interface.

FIG. 6 illustrates an example of a split transaction across the hub interface. As illustrated in FIG. 6, a hub agent initially obtains ownership of the hub interface via arbitration 302. Following the arbitration, there is a request phase 304. If necessary (e.g., in the case of returning data for a read transaction), a completion phase 308 will follow the request phase. Prior to the completion phase, however, the responding hub agent, will first arbitrate 306 for ownership of the hub interface.

In between the time of transmitting a request packet and a corresponding completion packet across the hub interface, separate unrelated packets may be transmitted across the hub interface in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the memory controller hub 204, may be transmitted to the I/O hub 206.

Furthermore, as shown in FIG. 6, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub interface uses transaction descriptors for routing of hub interface traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub interface provides the increased bandwidth despite using a narrow connection (e.g., less pins/pads).

In alternative embodiments, however, a hub interface may be implemented with less than all of the unique features as discussed above, without departing from the scope of the invention. Moreover, the hub interface could also be used to interconnect bridges and and/or other components within or external to a chipset, without departing from the scope of the present invention.

Transaction, Protocol and Physical Layers

For greater clarity, the hub interface is described in three parts: a transaction layer; a protocol layer; and a physical layer. The distinctions between layers, however, is to be regarded in an illustrative rather than a restrictive sense, and is therefore does not to imply a particular preferred embodiment.

Transaction Layer

In one embodiment of the hub interface, the transaction layer supports the routing of separate transactions transmitted across the hub interface (which may consist of one or more packets.) For example, in one embodiment, the transaction layer of the hub interface generates transaction descriptors, which are included in the requests and data packets. The transaction descriptors may be used to support arbitration between queues within a hub agent (e.g., MCH), and/or to facilitate routing of requests and data packets through the hub interface.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operations.) As a result, the operations, as identified by the transaction attributes, may be handled in accordance with a corresponding predetermined routing protocol in order to support a specific type of operation (e.g., isochronous.)

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

TABLE 1

Routing Field of Transaction Descriptor

| 5 | 4 | 3 | 2 | 1 | 0 |
|---|---|---|---|---|---|
| Hub ID | | | Pipe ID | | |

As shown in Table 1, three bits of the routing field are used for the Hub ID which identifies the hub agent that initiated the transaction. In alternative embodiments, to provide a hub interface hierarchy exceeding 8, additional bits could be used in the routing field.

Figure 7:
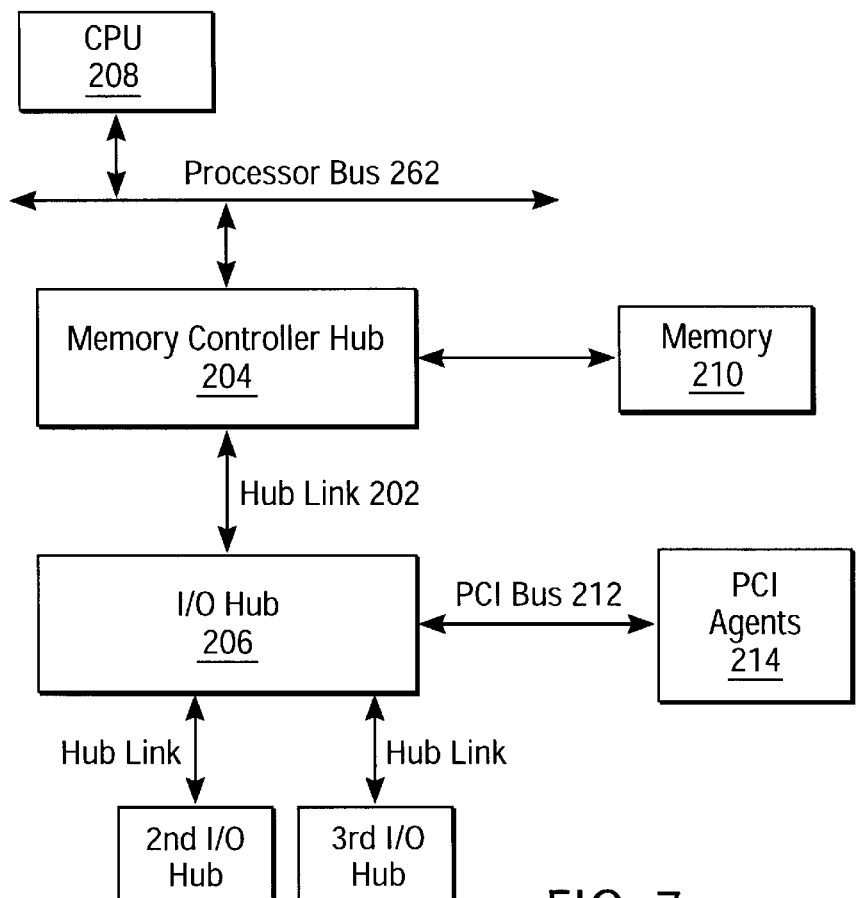
FIG. 7 is a block diagram of one embodiment of a computer system implementing a hierarchy of multiple improved interfaces between computer components.

For example, there may exist multiple hub interface hierarchies in a system, in which case the agent at the top of the hierarchies should be capable of routing completions back to the base of the hierarchy. In this context, "hierarchy" consists of multiple connected hub interface segments starting from a hub interface "root" agent (e.g., a Memory Control Hub.) For instance, FIG. 5 illustrates a system having only one hub interface hierarchy. FIG. 7, however, illustrates an example of system based on two hub interface hierarchies. In embodiments implementing only one hub interface hierarchy, a default value of "000" may be used in the Hub ID field.

The remaining three bits of the routing field may be used to identify internal pipes/queues within a hub interface agent. For example the I/O Control Hub may support internal USB (Universal Serial Bus) host controller traffic and Bus Mastering ID (BM-ID) traffic via separate "pipes." (USB refers to the Universal Serial Bus Specification version 1.0 adopted in 1996 available from the USB Implementers' Forum and its follow-on specifications.) As such, the Pipe ID may be used communicate to the servicing agent (e.g., MCH) that traffic initiated by different "pipes" have different attributes, and may be handled in accordance with a predetermined protocol. If a hub interface agent does not implement separate internal pipes, it may use a default value of "000" in the Pipe ID field.

In an alternative embodiment, the transaction descriptors further include an attribute field. In one embodiment, the attribute field is a three-bit value, which specifies how a transaction is to be handled when a target hub interface agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses such as IEEE 1394-compliant and USB-compliant busses. (IEEE-1394 refers to the IEEE 1394-1995 Specification adopted in 1995 and available from the Institute of Electrical and Electronics Engineers and its follow-on specifications.) Such data movement requirements need to be maintained as data flows through the hub interface between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly prefetchable" hint, to support a form of read caching and allow for more efficient use of the main memory bandwidth.

Ordering Rules

The transaction descriptors can also be used to support ordering rules between transactions transmitted across the hub interface. For example, in one embodiment, transactions with identical transaction descriptors are executed in strong order (i.e., first come-first serve.)

Transactions having the same routing field but different attribute fields, however, may be reordered with respect to each other. For example, in one embodiment, isochronous transactions do not need to be strongly ordered with respect to asynchronous transactions.

In addition, in one embodiment of the hub interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub interface, may vary within the scope of the invention. For example, in one embodiment, the hub interface implements the ordering rules provided in Peripheral Component Interconnect (PCI) (Revision 2.2) to determine the flow of traffic across the hub interface in opposite directions.

Protocol Layer

In one embodiment, the hub interface uses a packet-based protocol with two types of packets: request and completion. A request packet is used for each hub interface transaction. Completion packets are used where required, for example, to return read data, or to acknowledge completion of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub interface uses an arbitration protocol that is symmetric and distributed. For example, each hub agent drives a request signal, which is observed by the other agent attached to the same interface. No grant signal is used, and agents determine ownership of the interface independently.

Moreover, in one embodiment, no explicit framing signal is used. There is an implied relationship between the arbitration event that gives an agent ownership of the interface and the start of that agent's transmission. In alternative embodiment, framing signals could be used without departing from the scope of the invention.

The end of a packet transmission occurs when a hub interface agent that owns the interface (e.g., is in the process of transmitting data), releases its control of the interface by de-asserting a request signal. In addition, in one embodiment, flow control is also accomplished by using a STOP signal to retry or disconnect packets, as is described in more detail below.

Packet Definition

In one embodiment of the hub interface, data is transferred at a multiple rate (e.g., 1×, 4×, 8×) of the hub interface clock (HLCK), which in one embodiment is a common clock shared by the hub agents joined by the hub interface. The data is transmitted across a data signal path (PD) of the hub interface, which has an "interface width" of some power of two (e.g., 8, 16, 24, 32.) As a result, the hub interface may have varying data transfer granularities (i.e., transfer widths), depending upon the transfer rate and the width of the data signal path. For example, in the case of an eight-bit interface width in 4× mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4× mode) the less significant double-word (packet width) is transferred on the lower bytes of the data signal (e.g., PD [0:7]) and the more significant double-word is transferred in parallel on the upper bytes of the data signal (e.g., PD [15:8]). The two examples are shown below in table 2.

mented: a header section of a packet starts on the first byte of a transfer width; a data section of a packet (if present) starts on the first byte of a transfer width; and a packet occupies an integral number of transfer widths.

Any available transfer widths not consumed by a packet may be filled with a bogus double word (DW) transmission, and will be ignored by the receiving hub agent. In alternative embodiments, more, less, and/or different framing rules may be used by the hub interface within the scope of the present invention.

Table 3 and Table 4 set forth below, illustrate examples of the framing rules given above for the case of a 64 bit transfer width.

TABLE 2

Byte Transmission Order for 8 and 16 Bit Interface Widths

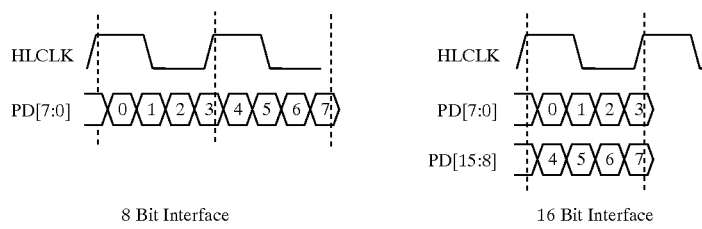

8 Bit Interface          16 Bit Interface

The Protocol Layer of the hub interface is also responsible for framing the data. As such, the framing rules implemented by the hub interface define how to map one or more packet widths onto a set of transfer widths. To simplify the parsing of packets into packet widths, in one embodiment of the hub interface, the following three framing rules are imple-

TABLE 3

Request using 32 Bit Addressing and Containing Three Double-words of Data

| 4th Byte Transmitted on PD[15:8] | 3rd Byte Transmitted on PD[15:8] | 2nd Byte Transmitted on PD[15:8] | First Byte Transmitted on PD[15:8] | 4th Byte Transmitted on PD[7:0] | 3rd Byte Transmitted on PD[7:0] | 2nd Byte Transmitted on PD[7:0] | First Byte Transmitted on PD[7:0] |
|---|---|---|---|---|---|---|---|
| Byte 7 | Byte 6 | Byte 5 | Byte 4 | Byte 3 | Byte 2 | Byte 1 | Byte 0 |

| Address (32b) || || Request Header || ||
| Second DW of Data || || First DW of Data || ||
| {Dummy DW} || || Third DW of Data || ||

TABLE 4

Request using 64 Bit Addressing and Containing Three Double-words of Data

| 4th Byte Transmitted on PD[15:8] | 3rd Byte Transmitted on PD[15:8] | 2nd Byte Transmitted on PD[15:8] | First Byte Transmitted on PD[15:8] | 4th Byte Transmitted on PD[7:0] | 3rd Byte Transmitted on PD[7:0] | 2nd Byte Transmitted on PD[7:0] | First Byte Transmitted on PD[7:0] |
|---|---|---|---|---|---|---|---|
| Byte 7 | Byte 6 | Byte 5 | Byte 4 | Byte 3 | Byte 2 | Byte 1 | Byte 0 |

| Address (31:2) || || Request Header || ||
| {Dummy DW} || || Address (63:32) || ||
| Second DW of Data || || First DW of Data || ||
| {Dummy DW} || || Third DW of Data || ||

Request Packets

The packet header format for request packets, according to one embodiment, is shown below in Table 5 and Table 6. In the examples shown in Tables 5 and 6, the base header is one double-word, with one additional double-word required for 32 bit addressing, and two additional double-words required for the 64 bit addressing mode. The fields of the headers, as shown in Tables 5 & 6 are described below the tables.

In alternative embodiments of the hub interface, the fields included in the header of the request packet may vary without departing from the scope of the invention. For example, the header may include additional field, less fields, or different fields in place of the fields shown below. Moreover, the encoding of the fields may also vary without departing from the scope of the invention.

Completion Packets

The header format for a completion packet, according to one embodiment, is shown below in Table 7. In one embodiment, the header is one double-word. The fields of the headers, as shown in Table 8 are described following the table.

In alternative embodiments of the hub interface, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

TABLE 5

Request Packet Header Format for 32 bit Addressing

| Last Byte Transmitted | | | | | | | | First Byte Transmitted | | |
|---|---|---|---|---|---|---|---|---|---|---|
| 31 30 29 28 27 | 26 25 24 | 23 22 21 | 20 19 18 17 16 | 15 14 13 12 11 10 9 8 | 7 6 5 4 3 2 1 0 | | | | | |
| rq/cp r/w cr af lk | Transaction Desc. Routing Field | | Reserved | TD Attr | Space | Data Length (DW) | Last DW BE | 1st DW BE | Base | |
| Addr[31:2] | | | | | | | | R ea / ct | Address | |

TABLE 6

Request Packet Header Format for 64 bit Addressing

| Last Byte Transmitted | | | | | | | First Byte Transmitted | | |
|---|---|---|---|---|---|---|---|---|---|
| 31 30 29 28 27 26 25 24 | 23 22 21 | 20 19 18 17 16 | 15 14 13 12 11 10 9 8 | 7 6 5 4 3 2 1 0 | | | | | |
| rq/cp r/w cr af lk | Transaction Desc. Routing Field | Reserved | TD Attr | Space | Data Length (DW) | Last DW BE | 1st DW BE | Base | |
| Addr[31:2] | | | | | | | R ea | 32 bit component | |
| Addr[63:32] | | | | | | | | 64 bit component | |

| | |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or a request (write). |
| Address Format (af) | The addressing format is either Implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |
| Data Length | The data length is given in double-words, encoded such that the number of double-words represented is one plus this number. Thus, "000000" represents one double-word. |
| Space | This field selects the destination space type for the request. In one embodiment, possible destination spaces include Memory ("00"), and IO ("01"). |
| 1st DW BE | Byte enables for the first double-word of any read or write request to Memory or IO. Byte enables are active low. If there is only one double-word for a request, this byte enable field is used. In one embodiment, it is illegal to issue a memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |
| Addr[31:2] | The 32 bit address is generated as it would be on PCI for same type of cycle. This double-word is included for the 32 and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

TABLE 7

Completion Packet Header Format

| Last Byte Transmitted | | | | | | | | | | | | | | | | | | | | | | | | First Byte Transmitted | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| rq cp | r/ w | Reserved | | lk | Transaction Desc. Routing Field | | | | | | Reserved | | TD Attr | | | Rsvd | | Data Length (DW) | | | | | | Completion Status | | | | | | | |

| | |
|---|---|
| Transaction Descriptor | The Transaction Descriptor Routing and Attribute fields as previously discussed in the Transaction section. |
| rq/cp | Completion packets are identified with a '1' in this location. |
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |
| Data Length | The data length is given in double-words, encoded such that the number of double-words represented is one plus this number. Thus, "000000" represents one double-word. |
| Completion Status | Indicates completion status using predetermined. |

Reserved All reserved bits are set to '0'.

In one embodiment of hub interface, completions for memory reads may provide less than the full amount of data requested so long as the entire request is eventually completed. Likewise, completions for memory writes may indicate that less than the entire request has been completed. This might be done to satisfy a particular hub interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with the corresponding request. In the case of multiple completions, the initiator accumulates a count of the data completed for the original request until the original request is fully completed.

Interface Arbitration and Packet Framing

In one embodiment of the hub interface, when the interface is idle, the assertion of a request from either hub agent connected to the interface, is considered an arbitration event. The first agent to request wins ownership of the interface. If agents request ownership simultaneously when the hub interface is idle, the least recently serviced hub agent wins. In one embodiment, all hub agents track the least recently serviced status (e.g., via a status flag of an internal register.) In alternative embodiment, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub interface agents attached to the same interface. The timeslice counter is started upon acquiring ownership of interface and counts hub interface base clock periods.

In one embodiment, each hub agent is responsible for managing its own timeslice allocation. As such, in one embodiment, a timeslice value may be programmed via a hub interface command register for each interface in each hub agent.

Figure 8:
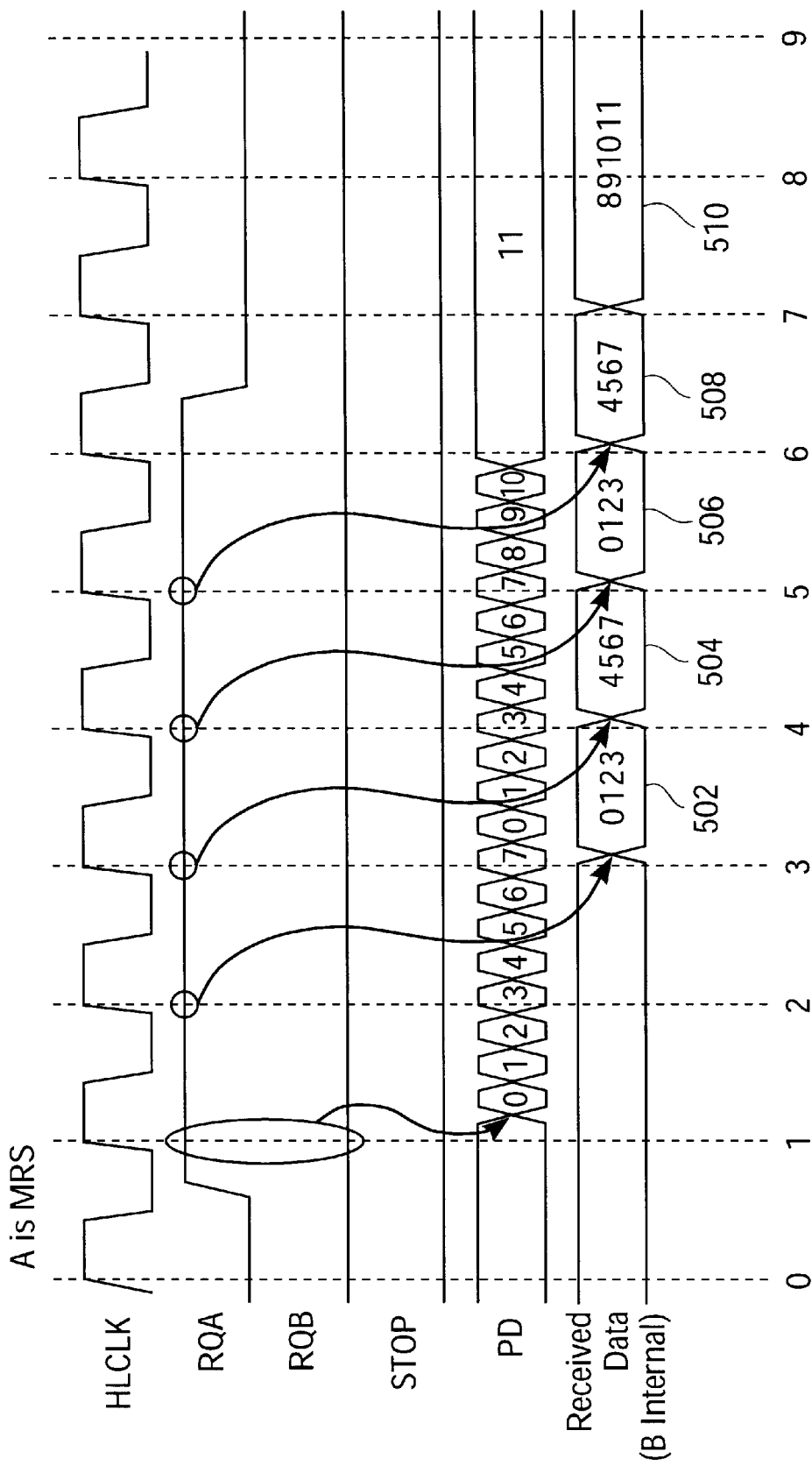
FIG. 8 is a timing diagram illustrating arbitration and transmission of data packets, according to one embodiment.

FIG. 8 illustrates an example of arbitration for the hub interface between hub agent A and agent B and the transfer of two packets. The example illustrates arbitration out of an idle interface state, with the interface then returning to idle. Moreover, in the example illustrated, the interface is using a 4x data transfer mode with eight bit data signal (PD) path. Agent A, in the example illustrated in FIG. 8, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 502 and 504 and requires two base clocks to transmit in the 4x mode. The second packet is three double-words 506, 508, and 510, and so requires three base clocks in the 4x mode.

Flow Control

In one embodiment, packets may be retried or disconnected by a receiving agent due to lack of request queue space, data buffer space, or for other reasons. In one embodiment, Flow control is accomplished using a STOP signal.

Figure 9:
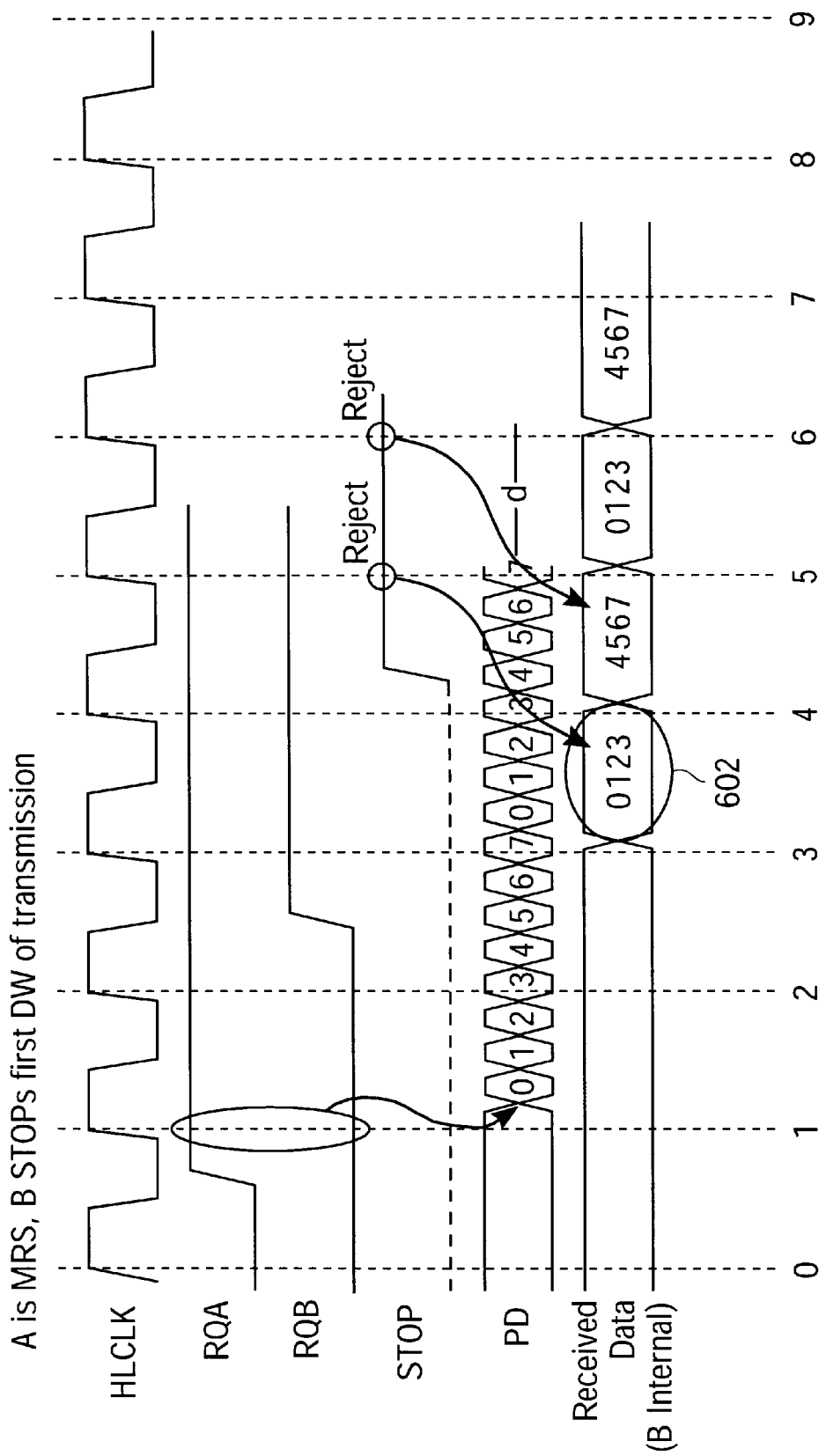
FIG. 9 is a timing diagram illustrating flow control of data packets, according to one embodiment.

FIG. 9 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1.)

Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 9, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4x mode (using an eight bit wide PD signal), the STOP signal is sampled each base clock. However, for a 1x mode, the STOP signal is sampled each fourth clock (with the beginning of a transaction being used as a reference point).

Figure 10:
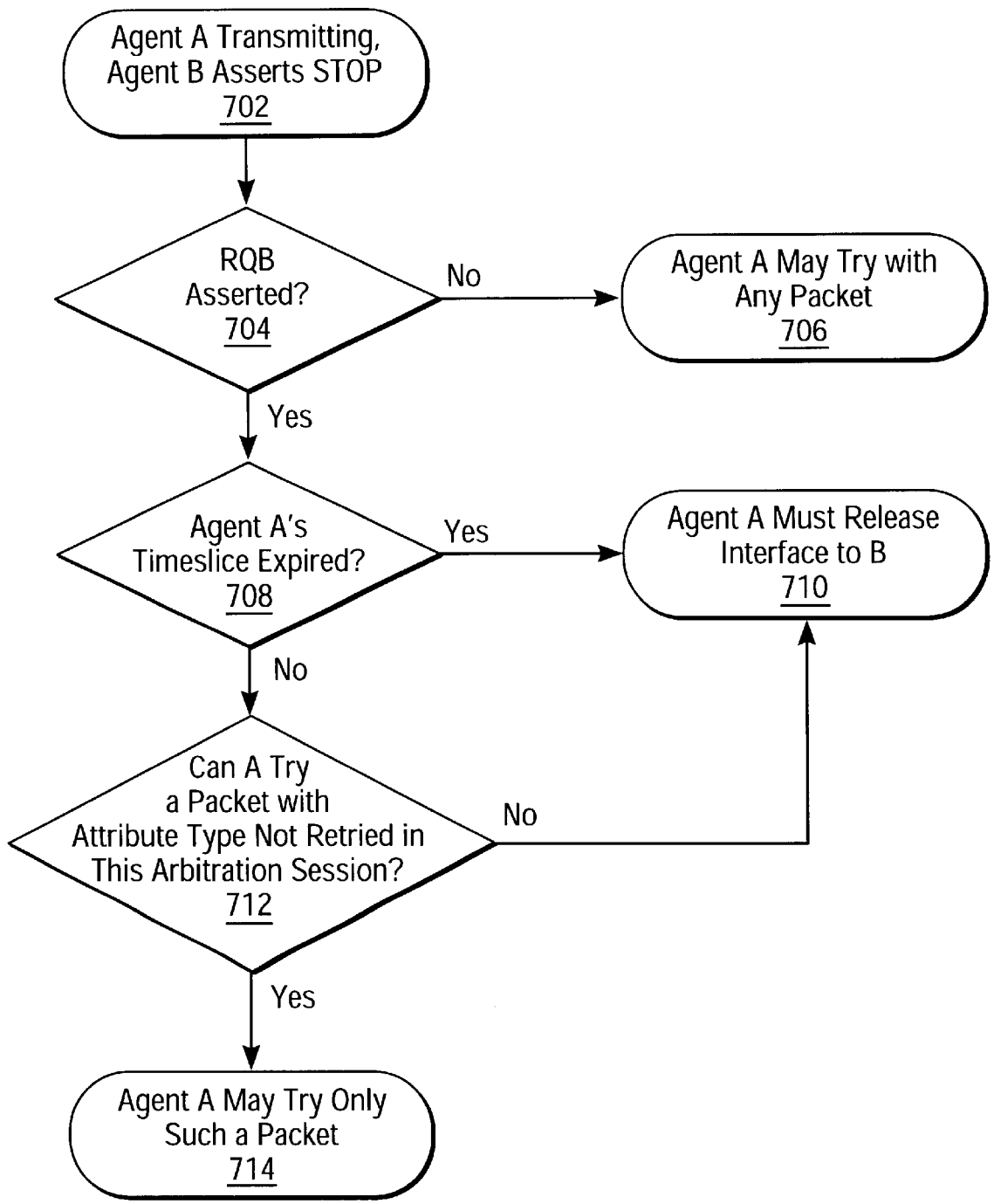
FIG. 10 illustrates a flow diagram describing the steps of responding to flow control operations according to one embodiment.

Following the reception of a STOP signal, the hub agent that receives the STOP signal determines whether it may retry sending additional packets. FIG. 10 is a flow diagram describing the steps performed by a hub agent in determining whether it may retry sending. a packet following receipt of a STOP signal, according to one embodiment.

In step 702, a hub agent that is currently transmitting packets receives a STOP signal. In response, in step 704 the hub agent that receives the STOP signal determines if the other agent (which activated the STOP signal) is requesting ownership of the interface, by sampling the other hub agents request signal (e.g., RQB.)

If the recipient of the STOP signal determines that the agent which sent the STOP signal is not requesting ownership of the interface, in step 706 the current owner of the interface may attempt to transmit a packet following recovery from the STOP. On the other hand, if it is determined that the agent which activated the STOP signal is requesting ownership, in step 708, the current owner determines if its timeslice has expired.

If the timeslice for the current owner of the interface has expired, in step 710, the current owner releases ownership. If the timeslice for the current owner has not expired, the current owner may transmit a packet with an attribute that is different from the interrupted packet. More specifically, in step 712, the current owner determines if it has a packet with a attribute type that is different from any packets that have been retried in the present arbitration session (i.e., the period of the current owner's tenure), which needs to be transmitted.

If the current owner does have a packet with a different attribute, in step 714 the current owner may attempt to transmit the packet. Otherwise, the current owner release ownership of the interface.

Physical Interface

In one embodiment, the hub interface implements a physical interface that operates at a base frequency of either 66 MHz or 100 MHz. Other frequencies may also be used. In addition, in one embodiment, the physical interface uses a source synchronous (SS) data transfer technique which can be quad-clocked to transfer data at 4× of the base hub interface clock. As a result, in an embodiment having an 8-bit data interface (e.g., PD) operating at a base frequency of 66 MHz or 100 MHz, a bandwidth of 266 megabytes per second (MB/s) or 400 MB/s may be achieved, respectively.

Furthermore, in one embodiment, the hub interface supports a voltage operation of 1.8V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

External Signals Definition

Figure 11:
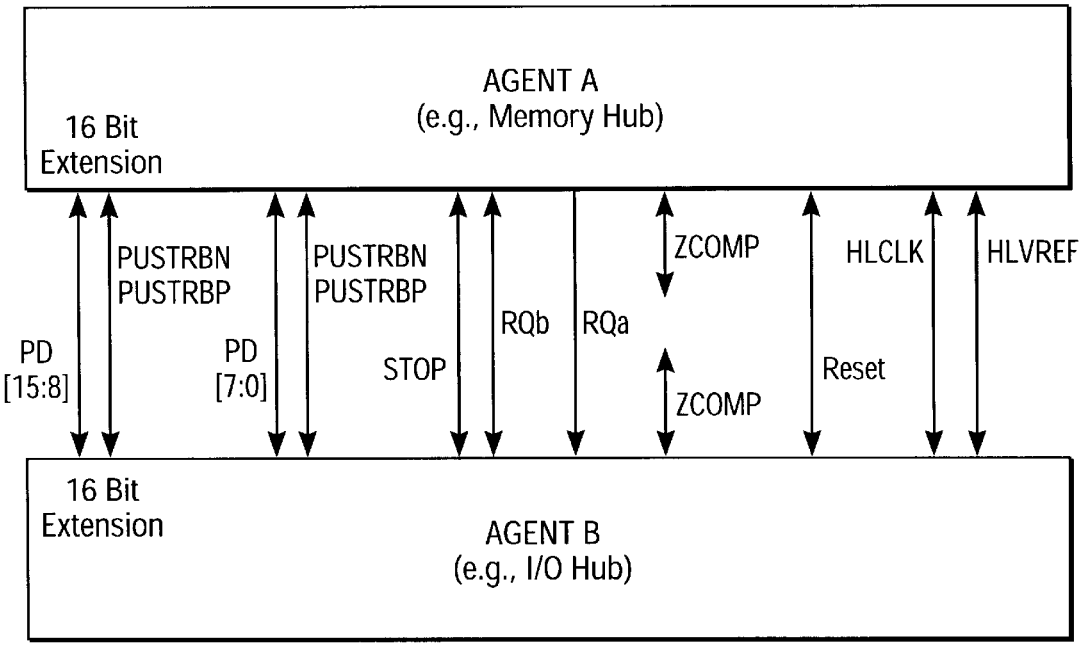
FIG. 11 illustrates the physical signal interface according to one embodiment.

FIG. 11 illustrates the physical signal interface of the hub interface between two hub agents, according to one embodiment. As shown in FIG. 11, the hub interface physical interface uses a bi-directional eight bit data bus (PD [7:0]) with a differential pair of source synchronous strobe signals (PSTRBN, PSTRBP) for data clocking. In an alternative embodiment, the interface can widened. For example, as shown in FIG. 11, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQa, RQb), and a bidirectional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations, are also included.

The physical signals shown in the interface illustrated in FIG. 11 are further described below in Table 8. In alternative embodiments of the hub interface, the signals included in the physical interface may vary without departing from the scope of the invention. For example, the physical interface may include more, less or different signals varying from the signals shown in FIG. 11 and further described below in Table 8.

TABLE 8

Hub interface Signals for Eight Bit Agents

| Name | Bits (Pads) | Type | Clock Mode | Description |
|---|---|---|---|---|
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |
| PSTRBN | 1 | ASTS | SS | Positive PD Interface Strobe, see PSTRBP description above. |
| RQa | 1 | I/O | CC[3] | Active-high request from agent A (output from A, input to B) to obtain ownership of the hub interface. RQa is asserted when agent A has data available to send, and is deasserted when either all of agent A's data has been sent or agent A determines that it should release the interface. Reset voltage value is VSSHL. |
| RQb | 1 | I/O | CC | Request from agent B (output from B, input to A). See above description of RQa. |
| STOP | 1 | ASTS | CC | Used for pipelined flow control to retry or disconnect packets. |
| HLCLK | 1 | I | N/A | hub interface base clock, in one embodiment, either 66 MHz or 100 MHz. This provides timing information for the common clock signals (described further below). |
| RESET# | 1 | I | CC | Active-low reset indication to hub interface agents.[4] |
| HLVREF | 1 | I | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |
| VCCHL | 4 | power | N/A | 1.8 V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal
[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub interface are transmitted in accordance with a common clock mode. More specifically, the timing of the signals that are transmitted via the common clock mode are referenced to a single clock (e.g., the hub interface clock.) In alternative embodiments, the signals may be tied to a system clock, exterior to the hub interface agents. Moreover, there may be more than one hub interface segment in a system, in which case different base clocks may be used for the different segments. For example, one component might implement both a 66 MHz base hub interface and a 100 MHz base hub interface.

Source Synchronous Transfer Mode Operation

In one embodiment, the packets/data are transmitted using a source synchronous clock mode, which provides a technique for multiplying the data transfer rate of data. For example, in an embodiment using 4× source synchronous clocking mode with an eight bit data signal path, transmitting a double-word (i.e., four byte) requires only one hub interface clock cycle (HLCK.) Alternatively, transmitting a double word using 1× source synchronous clocking mode on an eight bit data signal path would require a full hub interface clock cycle to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used by the receiving hub agent to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 12, in one embodiment a first data transfer corresponds to the rising edge of PSTRBP and the falling edge of PSTRBN. A second data transfer corresponds to the rising edge of PSTRBN and the falling edge of PSTRBP.

Figure 12:
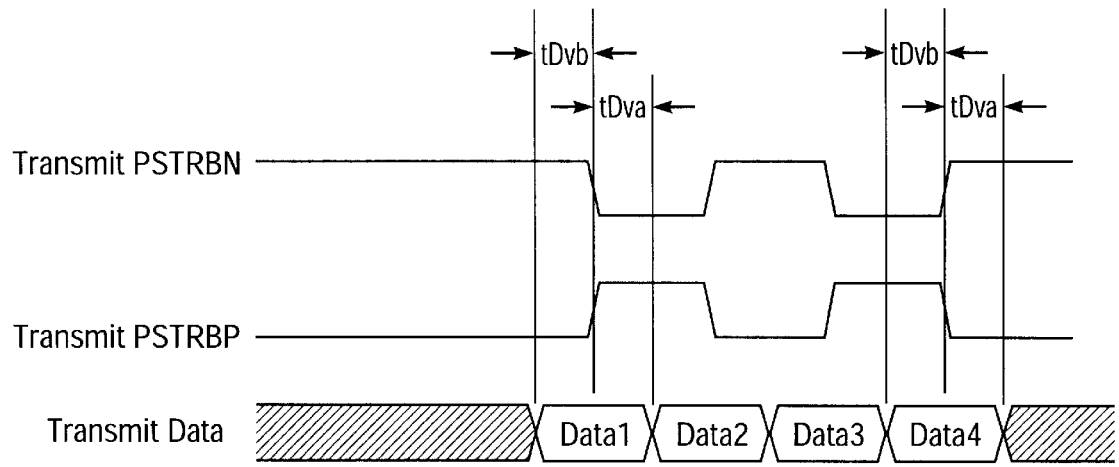
FIG. 12 is a timing diagram illustrating source synchronous clocking according to one embodiment.

In addition, in one embodiment, as further shown in FIG. 12, the transmit edges of the strobes PSTRBP/PSTRBN are positioned near the center of the data valid window. As a result, the receiving agent is given an input data sampling window to accommodate various system timing skews. Moreover, in one embodiment a minimum data valid before strobe edge (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub interface clock (HLCK) before being passed along within the hub agent.

Figure 13:
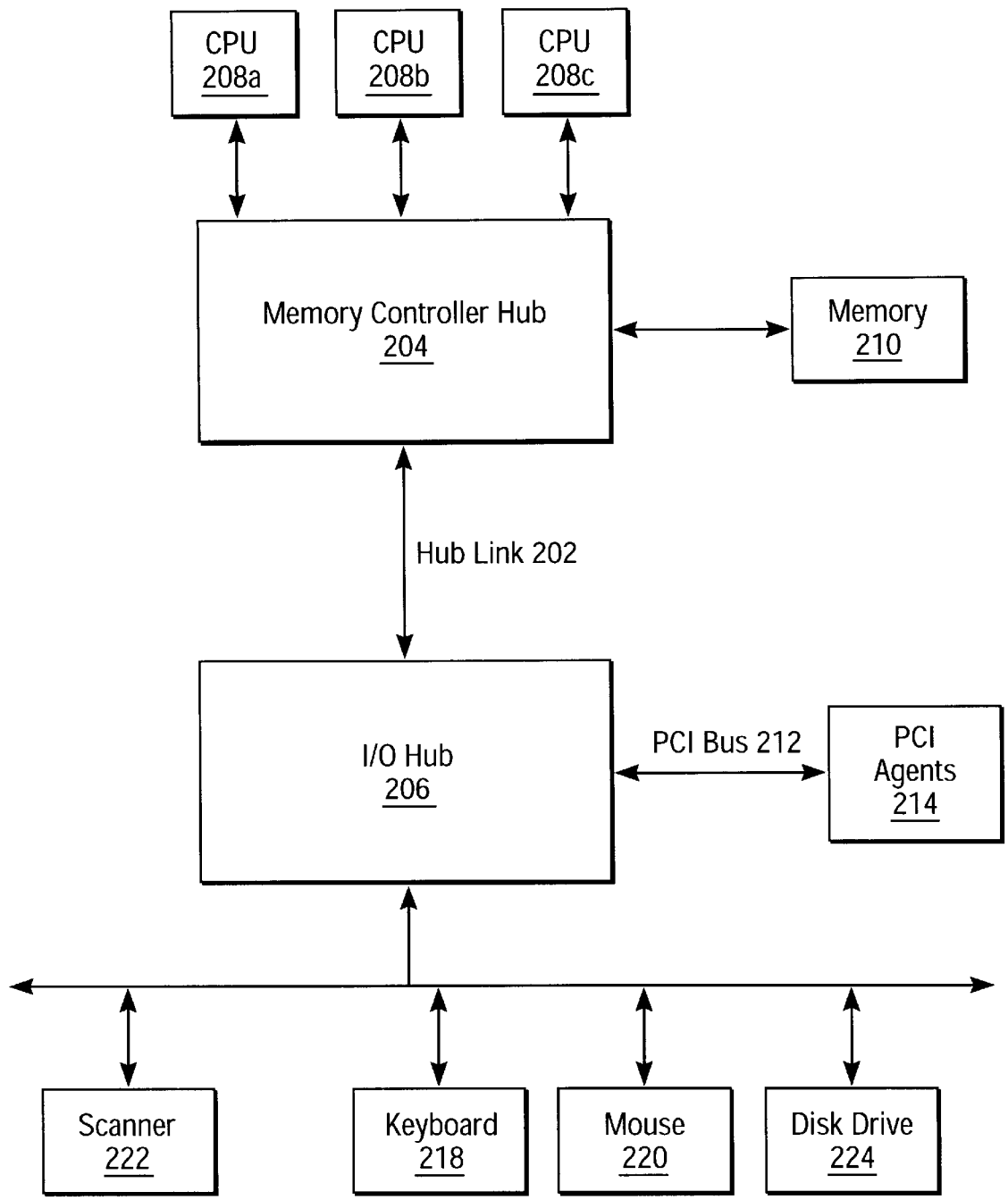
FIG. 13 illustrates a computer system having multiple processors implementing an improved interface between computer components according to one embodiment.

In the foregoing detailed description, the method and apparatus of the present invention has been described with reference to specific exemplary embodiments thereof. It will, however, be evident that various modifications and changes may be made thereto without departing from the broader spirit and scope of the present invention. For example, the hub interface, according to one embodiment, may be implemented in a computer system having multiple processors, as illustrated in FIG. 13. The present specification and figures are accordingly to be regarded as illustrative rather than restrictive.

What is claimed is:

1. A circuit comprising:
   a first multiplexer having an output, a first input, a second input, and a selector;
   a second multiplexer having an output, a first input, a second input, and a selector, the output of the second multiplexer coupled to the first input of the first multiplexer;
   a third multiplexer having an output, a first input, a second input, and a selector, the output of the third multiplexer coupled to the second input of the first multiplexer, the selector of the first multiplexer to select an input with a stable signal;
   a fourth multiplexer having an output, a first input, a second input, and a selector, the output of the fourth multiplexer coupled to the first input of the second multiplexer;
   a fifth multiplexer having an output, a first input, a second input, and a selector, the output of the fifth multiplexer coupled to the second input of the second multiplexer;
   a sixth multiplexer having an output, a first input, a second input, and a selector, the output of the sixth multiplexer coupled to the first input of the third multiplexer; and
   a seventh multiplexer having an output, a first input, a second input, and a selector, the output of the sixth multiplexer coupled to the second input of the third multiplexer.

2. The circuit of claim 1 wherein:
   the selector of the second multiplexer to switch when the selector of the first multiplexer switches away from the output of the second multiplexer.

3. The circuit of claim 2 wherein:
   the selector of the third multiplexer to switch when the selector of the first multiplexer switches away from the output of the third multiplexer.

4. The circuit of claim 1 wherein:
   the selector of the second multiplexer and the selector of the third multiplexer to provide at least one stable input to the first multiplexer.

5. The circuit of claim 4 wherein:
   the first input of the second multiplexer to switch only when the first input of the second multiplexer is not routed through to the output of the second multiplexer by the selector of the second multiplexer.

6. The circuit of claim 5 wherein:
   the second input of the second multiplexer to switch only when the second input of the second multiplexer is not routed through to the output of the second multiplexer by the selector of the second multiplexer.

7. The circuit of claim 6 wherein:
   the first input of the third multiplexer to switch only when the first input of the third multiplexer is not routed through to the output of the third multiplexer by the selector of the third multiplexer.

8. The circuit of claim 7 wherein:
   the second input of the third multiplexer to switch only when the second input of the third multiplexer is not routed through to the output of the third multiplexer by the selector of the third multiplexer.

9. The circuit of claim 2 wherein:
   the first input of the third multiplexer coupled to the second input of the third multiplexer.

10. The circuit of claim 1 wherein:
    the selector of the fourth multiplexer to switch only when the output of the fourth multiplexer is not routed through the second multiplexer.

11. The circuit of claim 10 wherein:
    the selector of the fifth multiplexer to switch only when the output of the fifth multiplexer is not routed through the second multiplexer.

12. The circuit of claim 11 wherein:
    the selector of the sixth multiplexer to switch only when the output of the sixth multiplexer is not routed through the third multiplexer.

13. The circuit of claim 12 wherein:
    the selector of the seventh multiplexer to switch only when the output of the seventh multiplexer is not routed through the third multiplexer.

14. A method comprising:

selecting between two inputs of a first multiplexer, the two inputs of the first multiplexer being coupled to outputs of a second multiplexer and a third multiplexer, wherein the first multiplexer, the second multiplexer, and the third multiplexer are components of a four-input multiplexing circuit, the four-input multiplexing circuit is part of an eight-input multiplexing circuit, the eight-input multiplexing circuit further includes eight inputs;

a fourth multiplexer having two inputs coupled to two of the eight inputs, the output of the fourth multiplexer coupled to the first input of the second multiplexer;

a fifth multiplexer having two inputs coupled to two of the eight inputs, the output of the fifth multiplexer coupled to the second input of the second multiplexer;

a sixth multiplexer having two inputs coupled to two of the eight inputs, the output of the sixth multiplexer coupled to the first input of the third multiplexer; and a seventh multiplexer having two inputs coupled to two of the eight inputs, the output of the seventh multiplexer coupled to the second input of the third multiplexer;

selecting between two inputs of the second multiplexer, the selecting of the second multiplexer performed when the selecting of the first multiplexer results in the first multiplexer selecting the output of the third multiplexer; and selecting between two inputs of the third multiplexer, the selecting of the third multiplexer performed when the selecting of the first multiplexer results in the first multiplexer selecting the output of the second multiplexer;

selecting between two inputs of the fourth multiplexer, the selecting of the fourth multiplexer performed when the selecting of the second multiplexer results in the second multiplexer selecting the output of the fifth multiplexer;

selecting between two inputs of the fifth multiplexer, the selecting of the fifth multiplexer performed when the selecting of the second multiplexer results in the second multiplexer selecting the output of the fourth multiplexer;

selecting between two inputs of the sixth multiplexer, the selecting of the sixth multiplexer performed when the selecting of the third multiplexer results in the third multiplexer selecting the output of the seventh multiplexer; and selecting between two inputs of the seventh multiplexer, the selecting of the seventh multiplexer performed when the selecting of the third multiplexer results in the third multiplexer selecting the output of the sixth multiplexer.

15. The method of claim 14 wherein:

the selecting of the first multiplexer performed in an alternating manner.

16. The method of claim 14 wherein:

the selecting of the first multiplexer performed by a clock signal coupled to the four-input multiplexing circuit.

17. The method of claim 14 wherein:

the second multiplexer having two inputs coupled to two of the four inputs; and the third multiplexer having two inputs coupled to two of the four inputs.

18. The method of claim 14 wherein:

the selecting of the third multiplexer does not change the output of the third multiplexer.

19. A system comprising:

a processor;

a memory control hub coupled to the processor;

a memory coupled to the memory control hub;

an i/o hub coupled to the memory control hub; and at least one of the processor, the memory control hub, the memory, and the i/o hub further comprising:

a first multiplexer having an output, a first input, a second input, and a selector;

a second multiplexer having an output, a first input, a second input, and a selector, the output of the second multiplexer coupled to the first input of the first multiplexer;

a third multiplexer having an output, a first input, a second input, and a selector, the output of the third multiplexer coupled to the second input of the first multiplexer, wherein the selector of the first multiplexer is to choose an input with a stable signal;

a fourth multiplexer having an output, a first input, a second input, and a selector, the output of the fourth multiplexer coupled to the first input of the second multiplexer;

a fifth multiplexer having an output, a first input, a second input, and a selector, the output of the fifth multiplexer coupled to the second input of the second multiplexer;

a sixth multiplexer having an output, a first input, a second input, and a selector, the output of the sixth multiplexer coupled to the first input of the third multiplexer; and a seventh multiplexer having an output, a first input, a second input, and a selector, the output of the sixth multiplexer coupled to the second input of the third multiplexer.

20. A chipset comprising:

a memory control hub capable of being coupled to a processor and capable of being coupled to a memory;

an i/o hub coupled to the memory control hub; and at least one of the memory control hub and the i/o hub further comprising:

a first multiplexer having an output, a first input, a second input, and a selector;

a second multiplexer having an output, a first input, a second input, and a selector, the output of the second multiplexer coupled to the first input of the first multiplexer;

a third multiplexer having an output, a first input, a second input, and a selector, the output of the third multiplexer coupled to the second input of the first multiplexer, wherein the selector of the first multiplexer is to choose an input with a stable signal;

a fourth multiplexer having an output, a first input, a second input, and a selector, the output of the fourth multiplexer coupled to the first input of the second multiplexer;

a fifth multiplexer having an output, a first input, a second input, and a selector, the output of the fifth multiplexer coupled to the second input of the second multiplexer;

a sixth multiplexer having an output, a first input, a second input, and a selector, the output of the sixth multiplexer coupled to the first input of the third multiplexer; and a seventh multiplexer having an output, a first input, a second input, and a selector, the output of the sixth multiplexer coupled to the second input of the third multiplexer.

21. A circuit comprising:

a first multiplexer having an output, a first input, a second input, and a selector;

a second multiplexer having an output, a first input, a second input, and a selector, the output of the second multiplexer coupled to the first input of the first multiplexer;

a third multiplexer having an output, a first input, a second input, and a selector, the output of the third multiplexer coupled to the second input of the first multiplexer, the selector of the first multiplexer to select the output of the second multiplexer when the output of the second multiplexer is stable, the multiplexer to select the output of the third multiplexer when the output of the third multiplexer is stable, the output of the second multiplexer stable when the output of the third multiplexer switches, the output of the third multiplexer stable when the output of the second multiplexer switches;

a fourth multiplexer having an output, a first input, a second input, and a selector, the output of the fourth multiplexer coupled to the first input of the second multiplexer;

a fifth multiplexer having an output, a first input, a second input, and a selector, the output of the fifth multiplexer coupled to the second input of the second multiplexer;

a sixth multiplexer having an output, a first input, a second input, and a selector, the output of the sixth multiplexer coupled to the first input of the third multiplexer; and a seventh multiplexer having an output, a first input, a second input, and a selector, the output of the sixth multiplexer coupled to the second input of the third multiplexer.

22. The circuit of claim 21 wherein:

the selector of the third multiplexer to switch to the first input of the third multiplexer only when the first input of the third multiplexer is stable, the selector of the third multiplexer to switch to the second input of the third multiplexer only when the second input of the third multiplexer is stable; and the selector of the second multiplexer to switch to the first input of the second multiplexer only when the first input of the second multiplexer is stable, the selector of the second multiplexer to switch to the second input of the second multiplexer only when the second input of the second multiplexer is stable.

* * * * *